Oct. 8, 1968     M. VERGALES ET AL     3,404,921
PNEUMATIC TRANSPORT DEVICE FOR CIGARETTES OR THE LIKE
Filed Jan. 30, 1967
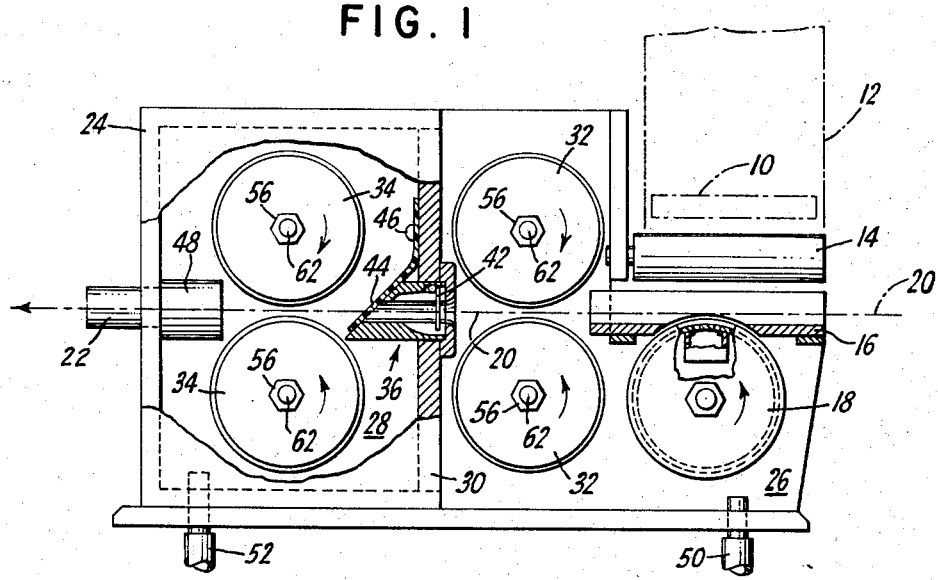
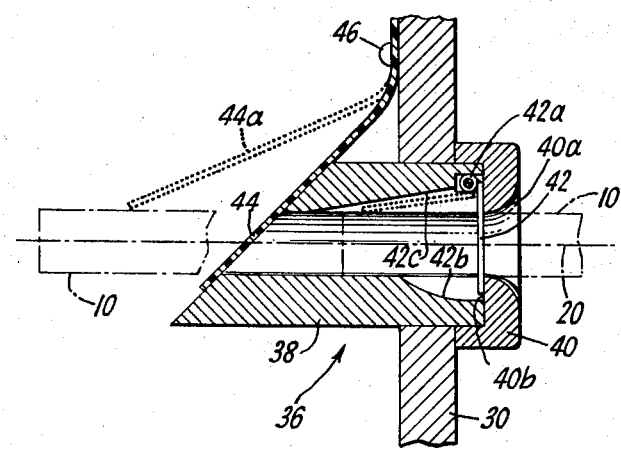
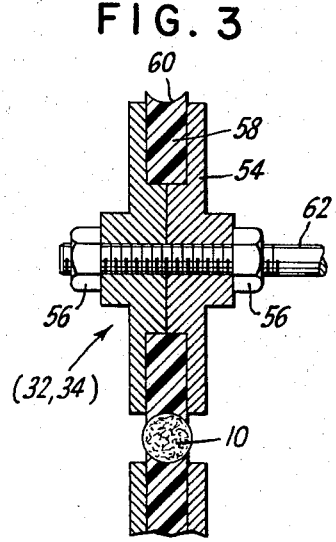
INVENTORS
MELVIN VERGALES
JAMES MEREDITH WOOLARD
BY
ATTORNEY 3,404,921
PNEUMATIC TRANSPORT DEVICE FOR
CIGARETTES OR THE LIKE
Melvin Vergales and James Meredith Woolard, Richmond, Va., assignors to American Machine & Foundry Company, a corporation of New Jersey
Filed Jan. 30, 1967, Ser. No. 612,472
7 Claims. (Cl. 302—2)

ABSTRACT OF THE DISCLOSURE

The following disclosure relates to a device for conveying and transferring rod-like articles into pneumatic transport tubes. The device comprises generally a valve type structure wherein air flow in an undesirable direction is prevented by providing means for positively moving an article through a one-way gate.

---

The present invention relates to a device, used in the manufacture of tobacco products, for conveying and transferring rods into pneumatic transport tubes. The device serves, in particular, as a valve whereby air flow, in an undesirable direction is prevented.

In the manufacture of tobacco products including cigarettes and filter rods, the latter is often transported from a making machine to a remotely located packing machine. The transporting of rods for this purpose, has lately been attempted through pneumatic tubes. One such system is shown in the co-pending application S.N. 574,882 filed Aug. 4, 1966, in the name of George Dearsley.

When inserting the rods into the pneumatic tubes, it is desirable to have a device or a valve whereby the flow of air from the tubes is inhibited during the interval that the rods are being inserted. One of such device shown in the aforementioned application comprises two endless foam rubber belts bearing against each other as they rotate. These belts reside between the pressurized air chamber of the pneumatic tubes, and the atmospheric space prevailing at the exterior thereof. The cigarettes for which this unit is designed, are conveyed between the belts to the pneumatic tubes. The foam rubber of the belts surrounds completely the individual cigarettes, as they are conveyed between the belts, and an effective air seal is thereby realized. While this particular construction is appropriate when used in conjunction with cigarettes, it tends to exhibit wear and require periodic replacement when applied to the relatively harder surfaced filter rods.

It is therefore a primary object of the present invention, to provide a device which is equally effective and useful with all types of rods. It is also an object of the present invention to provide a device, particularly applicable to transferring filter rods into pneumatic tubes.

Another object of the present invention is to provide a device for removing rods from a hopper or catcher belt and transferring them into pneumatic tubes to be transported to remote locations.

Yet another object of the present invention is to provide a device as described above which inhibits air loss from the pneumatic tubes while transferring filter rods thereinto.

The novel features which are considered as characteristic of the invention, are set forth in particular in the appended claims. The invention itself, however, both as to its additional objects and advantages thereof, will be best understood from the following description of specific embodiments when read in connection with the accompanying drawings, in which:

FIGURE 1 is an elevational view showing the construction of the device in relation to a hopper or catcher belt from which the filter rods are removed and conveyed to pneumatic transport tubes;

FIGURE 2 is an enlarged view, showing the valve arrangement of the device of FIG. 1.

FIGURE 3 is a partial cross-sectional view showing the constructional details of the feed rolls used within the device of FIG. 1.

Referring to the drawing and in particular to FIGURE 1, the individual filter rods 10 may be stored within a hopper 12 or arranged on a catcher belt as is shown in the aforementioned Dearsley application, for further processing. Agitator rollers 14 are provided at the exit of the hopper or outlet side of the catcher belt for the purpose of removing the rods therefrom. The agitator rollers are adapted to permit only a single rod to pass through them, at any one instant of time, and become deposited within the trough 16. A vacuum drum 18 is provided to operate in conjunction with the trough 16. When the individual filter rod 10 has passed the agitator rollers 14 and has been deposited within the trough 16, the vacuum drum 18 grips the filter rod and moves it along the axial path 20, in the direction indicated by the arrow thereon for eventual insertion in a pneumatic system of the type also shown in the Dearsley application represented in FIG. 1 by tube 22.

In accordance with the present invention, the device for effecting the transfer comprises a housing separated into two chambers 26 and 28 by a partition 30. The chamber 26, as will be seen, is open to the atmosphere while chamber 28 constitutes a pressure chamber pressurized to effect the movement of air through the tube 22 along the path of movement of rod indicated also by arrow 20.

Chamber 26 is provided with a pair of feed rollers 32 adapted to rotate in a direction to engage the rod and remove it from the vacuum drum 26. Chamber 28 is also provided with a pair of feed rollers 34 which in this case are adapted to rotate and engage the rod as it moves through the partition 30 and to force it into tube 22. The device also includes a valve assembly 36 built into the partition 30 for effecting the transfer without loss of pressure from chamber 28.

Referring to FIG. 2, the valve assembly 36 comprises a tubular body 38 fitted into the partition 30 along the line of travel 20 and projecting both into chamber 26 and chamber 28. The interior of tube 38 is formed with substantially the same Inner Diameter as the Outer Diameter of a rod 10. The rear or entrance end of body 38 is fitted with a cap 40 having a rounded inner surface 40a acting as a guide for rod entering from the primary feed rollers 32. The rear end of the body is also provided with a gate 42 pivoted about hinge 42a so as to open inwardly into the body. A portion of the lower inner surface of tube 38 is arcuately cut as shown by 42b to accommodate the swing of gate 42 as is a portion of the upper surface of tube cut away as shown by 42c to accommodate the gate as it is fully opened. To the closed position of gate 42 it abuts securely against the inner shoulder 40b of the end cap 40. The gate 42 may be normally spring biased if desired to maintain such abutment although it would be obvious in accordance with the mode of operation to be explained later that the air pressure and geometry of the gate itself obviate such need.

The forward exit end of the valve assembly tube 38 is provided with a flexible gate member or reed 44 fastened to portion 30 as at 46.

The gate member 44 is constructed of spring-like material which causes the valve to bear against the surface of the valve body, and thereby retain the exit side of the valve assembly closed, when a rod is not being forced through the assembly. The surface of the valve body, at the exit side, is inclined so that it provides a proper bearing surface for the reed valve, when the latter is in its closed position. As a result of this inclined surface of the exit side of the valve body, and the condition that the reed valve, when closed, overlaps with a portion of the valve body surrounding the interior opening, the valve serves as an effective air seal. When opened by the movement of the rod through the assembly, the reed flexes and assumes position shown in dotted line by the reed 44a.

In operation, a rod 10 is forced against the gate 42 by the action of the primary feed rollers 32. This causes the gate to open assuming the position 42c and the rod passes through the interior of the valve body. The rod thereupon abuts against the reed 44 and forces it open against the pressure within chamber 28. At a particular instant of time during the process, a rod or rods pass through the valve body opening simultaneously both the gate 42 and the reed 44. However, due to the condition that the filter rod fills substantially the interior of the tube 38 during this instant of time, no appreciable air leakage occurs from chamber 28 to chamber 26. Accordingly, the compressor equipment used to generate the pressure within the chamber 30, does not experience substantial additional loads during the process. Furthermore no reliance is placed upon the bearing pressure of any part of valve assembly upon the rods to effect an air seal. Therefore, since the spring pressure of the gate 42 and reed 44 are not relied upon for air sealing action, these spring pressures may be made substantially light and thereby not interfere or hinder the movements of the rods.

Upon emerging from the valve assembly 36 and past the reed 44, the rod is gripped by the secondary feed rollers 34, for the purpose of moving them along the path 20 and into a receiving tube 43 for subsequent entry into pneumatic tube 22. Once a filter rod has entered the receiving tube 48, the air pressure prevailing within the chamber 28 forces the rod to enter the pneumatic transport tube 22 and to be positively conveyed therethrough for further processing.

The air pressure within the chamber 30 also functions to maintain the reed 44 bearing against the inclined surface of bady 38 thereby to retain an effective air seal. In the event that inadvertent air leakage occurs through the reed 44 or when the reed member is opened by a rod the gate 42 is forced closed by the pneumatic pressure upon it whereby such air leakage is prevented from entering the chamber 26. Since the latter is an atmospheric chamber, any air pressure within the interior of the valve body, applies pressure against the butterfly valve 42 so that it is held firmly against the inner surface of the valve cap 40 and thereby form a satisfactory air seal or closure. When, on the other hand, the gate 42 is opened through the force exerted upon it by a rod guided by the primary feed rollers 32, the body of the filter rod forms a substantial seal and thereby prevents any appreciable air leakage to pass into the atmospheric chamber 28 as explained previously.

By means of well known apparatus through suitable connections 50 and 52, vacuum drum 18 and chambers 30 are evacuated and pressurized, respectively.

The design and structural arrangement of the primary and secondary feed rollers which are alike are shown in FIGURE 3. Each roller comprises flanges 54 secured to each other through fastening devices 56. The flanges are shaped so that when they are assembled to each other, they form a recess for retaining a rubber rim 58. Having at its perimeter, a concave surface 60 which corresponds to a portion of the exterior surface of the filter rod. This construction permits the filter rod to be readily grasped by the feed rollers and transported along the flow path 20, as shown. The rollers are supported on and driven by a shaft 62 mounted in bearing (not shown) held by the side walls of the housing 24.

While the invention has been illustrated and described as embodied in a specific form, it is not intended to be limited to the details shown, since various modifications and structural changes may be made without departing in any way from the spirit of the present invention.

We claim:
1. A pneumatic device for transferring elongated elements from a first environment to a second environment of substantially higher pressure comprising partitioning means for separating said first environment from said second environment, a body secured to said partitioning means and having an interior passage, the cross section of which conforms substantially to the cross section of said elongated element, said passage communicating with each of said environments through which said elements may pass from said first environment to said second environment, freely pivotal entrance gate means covering said passage communicating with said first environment when in its closed position and moving into said body interior when in open position, and freely pivotal exit gate means spaced from said entrance gate means covering said opening communicating with said second environment when in its closed position and moving away from said opening in open position, said gate means being normally closed on action of pressure differential between environments and openable on movement of said elongated elements.

2. In a processing machine for tobacco products, a pneumatic device for transferring elongated cylindrical elements from a first environment to a second environment of substantially higher pressure comprising, in combination, partitioning means for separating said first environment from said second environment, a tubular body secured to said partitioning means and having an interior passage the diameter of which is substantially equal to the diameter of said product, said passage communicating with each of said environments through which said product may pass, entrance gate means covering said passage communicating with said first environment when in its closed position and moving into said body interior when in open position, feed means mounted within said first environment and moving said elements toward said entrance gate means and into said body passage, exit gate means spaced from said entrance gate means covering said passage communicating with said second environment when in its closed position, and moving away from said passage when in open position, and feed means mounted within said second environment for receiving said elements upon leaving said passage and guiding said element for further processing.

3. The device according to claim 2, wherein each of said feed means comprises a pair of rollers spaced from each other to permit said cylindrical element to be passed between them as a result of pressure applied to said elements by said rollers, supporting shaft means for rotatably supporting said rollers in spaced relationship from each other, and driving means for driving said rollers so that they rotate in opposite directions and thereby force said elements to be moved between them.

4. In a processing machine for tobacco products, a pneumatic device for transferring rods from a first chamber into a second chamber of substantially higher pressure comprising, in combination, partitioning means for separating said first chamber from said second chamber, a valve body secured to said partitioning means and having an interior passage, communicating with each of said chambers, through which said rods may pass, an entrance gate pivotally hinged to said body and covering said opening communicating with said first chamber when in its closed position, and pivoting into said passage on entrance of a rod into said passage, cap means engaging the entrance end of said body having a funnel-shaped opening for guiding said rods against said entrance gate and into said interior passage, said entrance gate bearing against said cap means to seal said interior passage from said first chamber, exit gate means spaced from said entrance gate covering said passage communicating with said second chamber when in its closed position and movable away from said passage on exiting of a rod from said passage, said gate means being normally closed by pressure from said second chamber.

5. The invention as defined in claim 4, including conveying means for conveying said rods into said primary feed means.

6. The invention as defined in claim 5, including distributing means for distributing to said conveying means individual rods in serial sequence.

7. In a processing machine for tobacco products, a pneumatic device for transferring rods from a first chamber into a second chamber of substantially higher pressure comprising, in combination, a housing, partitioning means mounted within said housing for separating said housing into said first and second chambers, a tubular valve body extending partially into said first and second chambers secured to said partitioning means, said valve body having an interior passage through which said rods may pass from said first chamber to said second chamber, said passage having an inner diameter substantially equal to the outer diameter of said rods, means for moving said rod into said passage and means for removing said rod from said passage, an entrance gate pivotally hinged to said valve body normally closing said passage from first chamber and opening into said passage on movement of a rod therethrough, cap means surrounding the entrance end of said tubular body having a funnel-shaped opening for guiding said rods against said entrance gate and into said interior passage, said entrance gate being interposed between the edge of said tubular body and said cap and bearing against said cap to seal said interior passage from said first chamber on application of pressure from said second chamber through said passage, exit gate means spaced from said entrance gate normally closing said passage from said second chamber and opening into said second chamber on movement of a rod through said passage, and means for serially feeding rods to said means for moving said rods through said passage.

References Cited
UNITED STATES PATENTS

| | | | |
|---|---|---|---|
| 2,193,738 | 3/1940 | Perrin | 302—62 |
| 2,708,040 | 5/1955 | Somogyi | 214—17.4 |

ANDRES H. NIELSEN, *Primary Examiner.*